United States Patent
Frasher et al.

(10) Patent No.: US 8,225,270 B2
(45) Date of Patent: Jul. 17, 2012

(54) TECHNIQUE FOR MANAGING THE PROCESS OF DEVELOPING SOFTWARE

(75) Inventors: Thomas A. Frasher, Sunnyvale, CA (US); Todd M. Fitch, Santa Clara, CA (US)

(73) Assignee: Intuit Inc., Mountain View, CA (US)

(*) Notice: Subject to any disclaimer, the term of this patent is extended or adjusted under 35 U.S.C. 154(b) by 1270 days.

(21) Appl. No.: 11/818,178

(22) Filed: Jun. 12, 2007

(65) Prior Publication Data
US 2008/0313598 A1    Dec. 18, 2008

(51) Int. Cl.
*G06F 9/44* (2006.01)
*G06Q 10/00* (2006.01)

(52) U.S. Cl. ........ 717/101; 717/102; 717/103; 717/124; 705/7.39; 705/7.41; 705/7.16

(58) Field of Classification Search .................. None
See application file for complete search history.

(56) References Cited

U.S. PATENT DOCUMENTS

| | | | |
|---|---|---|---|
| 5,907,490 A * | 5/1999 | Oliver | 700/90 |
| 6,519,763 B1 * | 2/2003 | Kaufer et al. | 717/101 |
| 6,571,215 B1 * | 5/2003 | Mahapatro | 705/7.12 |
| 7,406,432 B1 * | 7/2008 | Motoyama | 705/7.16 |
| 7,509,626 B1 * | 3/2009 | Barnes et al. | 717/101 |
| 7,559,049 B1 * | 7/2009 | Hemmat et al. | 717/102 |
| 7,562,338 B2 * | 7/2009 | Knutson et al. | 717/101 |
| 7,774,743 B1 * | 8/2010 | Sanchez et al. | 717/103 |
| 8,032,863 B2 * | 10/2011 | Kolawa et al. | 717/124 |
| 2003/0009740 A1 * | 1/2003 | Lan | 717/102 |
| 2003/0115570 A1 * | 6/2003 | Bisceglia | 717/101 |
| 2004/0117267 A1 * | 6/2004 | Kilburn et al. | 705/7.39 |
| 2005/0114830 A1 * | 5/2005 | Knutson et al. | 717/102 |
| 2005/0240903 A1 * | 10/2005 | Lake | 717/124 |
| 2005/0246214 A1 * | 11/2005 | Chinnagiri | 705/7.41 |
| 2006/0123389 A1 * | 6/2006 | Kolawa et al. | 717/101 |
| 2006/0149575 A1 * | 7/2006 | Varadarajan et al. | 705/7.39 |
| 2007/0168918 A1 * | 7/2007 | Metherall et al. | 717/101 |
| 2008/0092108 A1 * | 4/2008 | Corral | 717/101 |
| 2008/0141214 A1 * | 6/2008 | Olson | 717/101 |

OTHER PUBLICATIONS

"Analysis of Requirements Volatility during Software Development Life Cycle", N Nurmuliani, Didar Zowghi et al., pp. 1-10, <http://ieeexplore.ieee.org/stamp/stamp.jsp?tp=&arnumber=1290455>.*
John S. Osmundson et al., "Quality management metrics for software development", [Online], 2002, pp. 1-14, [Retrieved from Internet on Mar. 20, 2012], <http://www.cin.ufpe.br/hermano/cursos/si/artigos/quality-management-metrics-for-software-development.pdf>.*

(Continued)

*Primary Examiner* — Thuy Dao
*Assistant Examiner* — Ziaul A Chowdhury
(74) *Attorney, Agent, or Firm* — Park, Vaughan, Fleming & Dowler LLP; Steven E Stupp

(57) ABSTRACT

A system that manages development of software is described. During operation, this system aggregates status information and requirement information as a function of time, where the status information specifies the status of the development of the software and the requirement information specifies target requirements for the software. Next, the system dynamically determines a project estimate for the development of the software based on the status information and the requirement information.

26 Claims, 4 Drawing Sheets

OTHER PUBLICATIONS

Andrew Ayers, "TraceBack: First Fault Diagnosis by Reconstruction of Distributed", [Online], 2005, pp. 201-212, [Retrieved from Internet on Mar. 20, 2012], <http://delivery.acm.org/10.1145/1070000/1065035/p201-ayers.pdf>.*

Rajiv D. Banker et al., Performance Evaluation Metrics for Information Systems Development a Principle Agent Model, [Online],1992, pp. 379-400, [Retrieved from Internet on Mar. 20, 2012], <http://www.pittedu.~ckemerer/CK%20research%20papers/PerformEvaluationMetrics_BankerKemerer1992.pdf>.*

Duncan D.A. Ruiz et al., "A Data Warehousing Environment to Monitor Metrics in Software Development Processes", [Online], 2005, pp. 1-5, [Retrieved from Internet on Mar. 20, 2012], <http://www.inf.pucrs.br/~duncan/arquivos/ruiz-Warehousing.pdf>.*

\* cited by examiner

STATUS INFORMATION 410-1:
- TIME STAMP 412-1
- NUMBER OF BUGS 414-1
- FEATURES 416-1
- NUMBER OF ENGINEERS 418-1
- NUMBER OF HOURS WORKED 420-1
- HOURS OF TESTING 422-1
- LINES OF CODE 424-1
- ...

STATUS INFORMATION 410-2

REQUIREMENT INFORMATION 510-1:
- TIME STAMP 512-1
- TARGETED COMPLETION 514-1
- BUDGET 516-1
- USER REQUIREMENTS 518-1
- QUALITY METRIC(S) 520-1
- OPERATING ENVIRONMENTS 522-1
- NUMBER OF USERS 524-1
- ...

REQUIREMENT INFORMATION 510-2

...

TECHNIQUE FOR MANAGING THE PROCESS OF DEVELOPING SOFTWARE

BACKGROUND

The present invention relates to techniques for managing the process of developing software.

Many software applications are becoming increasingly more complicated, and thus, more time consuming and difficult to develop. Simultaneously, customers and investors now expect development of software to be a predictable process that meets design targets on-time and within budgetary constraints. Consequently, companies are increasingly emphasizing project management during the development of software.

Unfortunately, the software development process is also becoming increasingly dynamic, with frequent changes being made to design targets and available engineering resources during a given project. It is often difficult to keep track of all of these changes and to accurately manage the resources needed to meet the design targets using existing project management tools.

SUMMARY

One embodiment of this invention provides a system that manages development of software. During operation, this system aggregates status information and requirement information as a function of time, where the status information specifies the status of the development of the software and the requirement information specifies target requirements for the software. Next, the system dynamically determines a project estimate for the development of the software based on the status information and the requirement information.

In some embodiments, the dynamic determination involves generating a first multi-dimensional vector corresponding to at least a portion of the status information and generating a second multi-dimensional vector corresponding to at least a portion of the requirement information. Then, the system calculates a difference between the first multi-dimensional vector and the second multi-dimensional vector. Note that generation of the first multi-dimensional vector and/or the second multi-dimensional vector may involve using different weights for two variables in at least the portion of the status information and/or the requirement information.

In some embodiments, the status information includes: time stamps, a number of reported bugs, features to be developed for the software, a number of development engineers, a number of hours worked developing the software, a number of hours worked testing the software, and/or a number of lines of code in the software.

In some embodiments, the requirement information includes: time stamps, a targeted completion time, budgetary constraints, user requirements, one or more quality metrics for the software, one or more operating environments, and/or a number of users. For example, the requirement information may include a confidence region surrounding an end point in the development.

In some embodiments, the project estimate includes an estimated completion time and/or recommended modifications to development resources to meet a targeted completion time. These recommended modifications may include changes to a number of development engineers and/or changes to features to be developed for the software.

In some embodiments, the project estimate includes recommended modifications to user requirements and/or recommended modifications to a quality metric for the software. These recommended modifications may include changes to features to be developed for the software and/or changes to the confidence region surrounding an end point in the development.

In some embodiments, the aggregation of the status information and/or the requirement information involves adding or subtracting variables as a function of time.

In some embodiments, the project estimate is based on a rate at which development engineers develop a given feature for the software and/or a rate at which development engineers correct a given reported bug in the software.

Another embodiment provides a method for managing the development of software. This method may perform at least some of the above-described operations.

Another embodiment provides a computer program product for use in conjunction with the system. This computer program product may include instructions corresponding to at least some of the above-described operations.

BRIEF DESCRIPTION OF THE FIGURES

FIG. 4 is a block diagram illustrating a data structure in accordance with an embodiment of the present invention.

FIG. 5 is a block diagram illustrating a data structure in accordance with an embodiment of the present invention.

Note that like reference numerals refer to corresponding parts throughout the drawings.

DETAILED DESCRIPTION

Figure 1A:
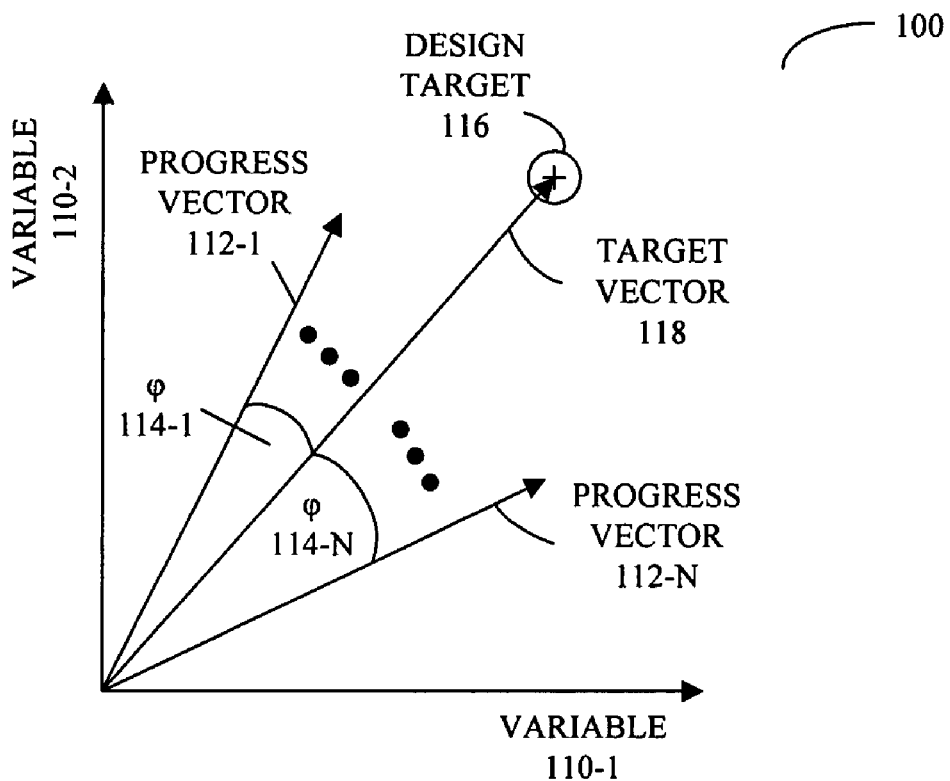
FIG. 1A is a graph illustrating progress vectors and a target vector during the software development process in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Embodiments of a computer system, a method, and a computer program product (i.e., software) for use with the computer system are described. These systems, software, and processes may be used to manage development of software (such as programs or modules). In particular, the computer system may aggregate status information (which specifies a status of the development of the software) and requirement information (which specifies target requirements for the software) as a function of time. Using the status information and the requirement information, the computer system dynamically determines a project estimate for the development of the software. For example, the computer system may generate multi-dimensional vectors corresponding, respectively, to at least a portion of the status information and the requirement information. Then, the computer system may calculate a difference between these multi-dimensional vectors.

These techniques may be implemented as a stand-alone software application, or as a program module or subroutine in another application. Furthermore, at least a portion of the program may be configured to execute on a client computer (such as a personal computer, a laptop computer, cell phone, PDA, or other device capable of manipulating computer readable data) or remotely from a client computer via computing systems over a network (such as the Internet, Intranet, LAN, WAN, MAN, or combination of networks, or other technology enabling communication between computing systems). Therefore, the information used to manage development of the software may be stored locally (for example, on a local computer) and/or remotely (for example, on a computer or server that is accessed via a network).

We now describe embodiments of systems and processes for managing the development of software. Quality assurance and engineering managers often attempt to determine the needs of a development project, including: the amount of time, resources, and/or expenses associated with completing a specific number of tasks. In the discussion that follows, targeting techniques are used to assist these managers in this process, thereby helping them answer a question such as: can an engineering or quality-assurance goal be achieved given the current status of and resources available to the development project?

These targeting techniques allow the question to be re-expressed as a multivariate, dynamic problem, which can be repeatedly solved as variables and/or design goals or targets change. The resulting project estimates may assist the quality assurance and engineering managers in managing the development of software, for example, by allowing these managers to determine and modify resource allocation, as needed, throughout the project.

FIG. 1A presents a graph illustrating an embodiment 100 of progress vectors 112 and a target vector 118 in a multi-dimensional space during the software development process. This multi-dimensional space includes numerous variables 110 associated with the status information (which may be collected or aggregated over time from multiple sources), and a given progress vector (such as progress vector 112-1) may indicate a current position in this space (at a given time) associated with one or more of these variables 112 during the development of the software.

Furthermore, the target vector 118 (which includes information associated with the requirement information) may indicate a current position and tolerance (or confidence region) of an end point or design target 116 of the development. Note that each of the progress vectors 112 may be oriented at angles φ114 relative to the target vector 118, and the given progress vector may be generated using one or more of the variables 110 (for example, one or more of the variables 110 may be scaled to form dimensionless quantities that are then linearly combined).

In some embodiments, the status information includes: time stamps, a number of reported bugs, a defect discovery rate, defect discovery acceleration, a defect resolution rate, defect resolution acceleration, features to be developed for the software, a number of development engineers (and more generally, available human resources), experience of the development engineers, a number of hours worked developing the software, a percentage of testing that is automated, a number of hours worked testing the software, a test coverage percentage, effectiveness of the testing, a percentage of code that is reused from previous projects, a number of lines of code in the software, a code-path coverage percentage, a rate of code development or change, and/or other development information. Moreover, in some embodiments the requirement information includes: time stamps, a targeted completion time, budgetary constraints, user requirements, a rate of change in the user requirements, one or more quality metrics for the software (such as a number of defects or bugs), one or more operating environments, a number of users, and/or other requirement information.

As noted previously, the information in at least some of the variables 110 may be dynamic. Consequently, in some embodiments, the aggregation of the status information and/or the requirement information involves adding or subtracting variables as a function of time.

Moreover, in some embodiments one or more variables make a larger contribution to the given progress vector. Therefore, generation of the given progress vector may involve using different weights for at least two variables. Note that at least these two variables may be associated with at least a portion of the status information and/or the requirement information.

Figure 1B:
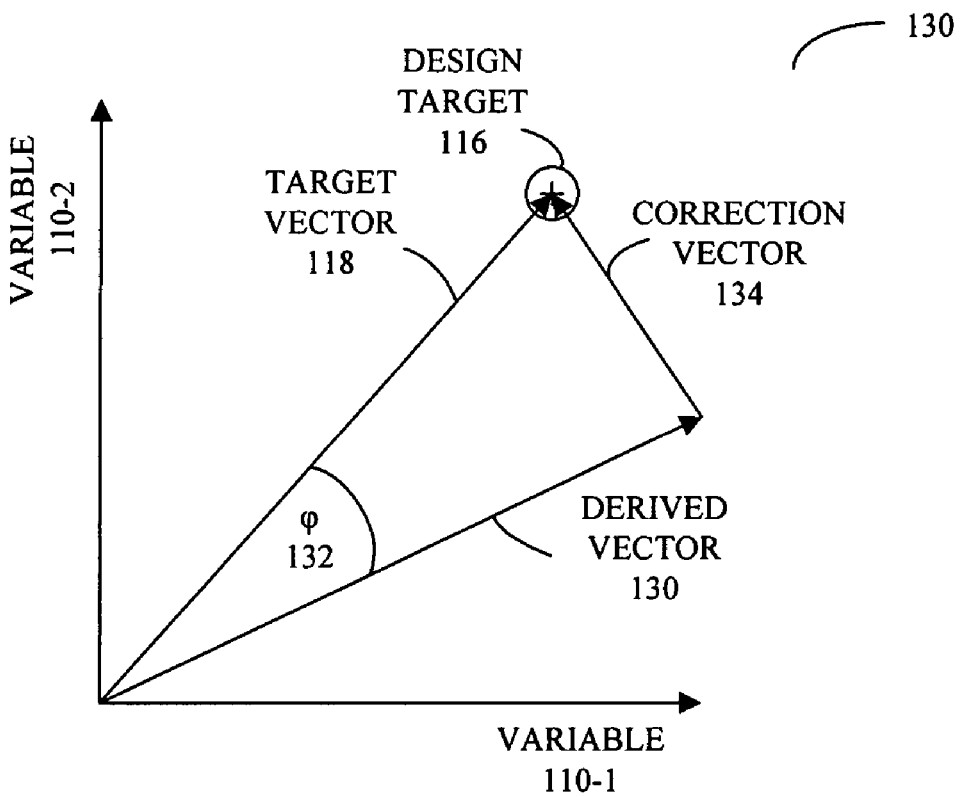
FIG. 1B is a graph illustrating a derived vector and a correction vector during the software development process in accordance with an embodiment of the present invention.

By comparing the progress vectors 112 (or a vector derived from the progress vectors 112) and the target vector 118, an estimate of our ability to reach the design target 116 and, if not, how to get there can be determined. This is shown in FIG. 1B, which presents a graph illustrating an embodiment 130 of a derived vector 130 and a correction vector 134 in the multi-dimensional space during the software development process. Note that the derived vector 130 may be oriented at angle φ132 relative to the target vector 118.

In some embodiments, if all the variables 110 are assigned equal weights, the derived vector 130 may be determined from the progress vectors 112 using the formula $$B=\sqrt{V_1^2+V_2^2+\ldots V_N^2},$$

where $V_i$ is the sum of the components of the $i^{th}$ variable in the progress vectors 112. More generally, the derived vector 130 may be determined from the progress vectors 112 using the formula $$B=\sqrt{\alpha_1 V_1^2+\alpha_2 V_2^2+\ldots+\alpha_N V_N^2},$$

where $\alpha_i$ is the weight associated with the sum of the components of the $i^{th}$ variable. Then, the correction vector 134 may be calculated by subtracting the derived vector 130 from the target vector 118. Note that in some embodiments different weights may be used for components of the $i^{th}$ variable associated with at least two different progress vectors 112.

Correction vector 134 may be used to determine a project estimate, such as an estimated completion time and/or recommended modifications to the allocated development resources to meet a targeted completion time. These recommended modifications may include changes to a number of development engineers and/or changes to features to be developed for the software.

In some embodiments, the project estimate includes recommended modifications to user requirements associated with the design target 116 and/or recommended modifications to a quality metric for the software. These recommended modifications may include changes to features to be developed for the software and/or changes to the confidence region surrounding the design target 116. Moreover, in some embodiments the project estimate is based on a rate at which development engineers develop a given feature for the software and/or a rate at which development engineers correct a given reported bug in the software.

In an exemplary embodiment, the requirement information associated with design target 116 includes: a completion date (such as June $1^{st}$), less than 10 defects, 5 program modules to be developed during the project, a $100,000 budget, and a confidence region of 10%. Furthermore, the status information includes: 5 engineers currently working on the project, each of whom can correct 1 defect or bug per week.

By generating and then subtracting the derived vector 130 from the target vector 118 multiple times during the project, engineering and/or quality assurance managers can dynamically determine whether or not they will be able to reach this design target. At any given time, if there is overshoot (i.e., they will reach the design target 116 too soon), the project plan may be suitably modified to reduce or decrease the allocated resources. However, if there is undershoot (i.e., they will not reach the design target 116 in time), additional resources may be allocated. Alternatively, the design target 116 may be suitably modified.

This targeting technique allows project estimates to be continuously or discretely determined (for example, after a time interval has elapsed), thereby accommodating multiple modifications to the project and/or its scope during the project. Moreover, this capability facilitates the development of software on-time, on budget, and with improved quality.

Note that embodiments 100 (FIG. 1A) and/or 130 may include: fewer or additional components, two or more components are combined into a single component, and/or a position of one or more components may be changed. Moreover, a wide variety of software languages may be used to implement this targeting technique.

Figure 2:
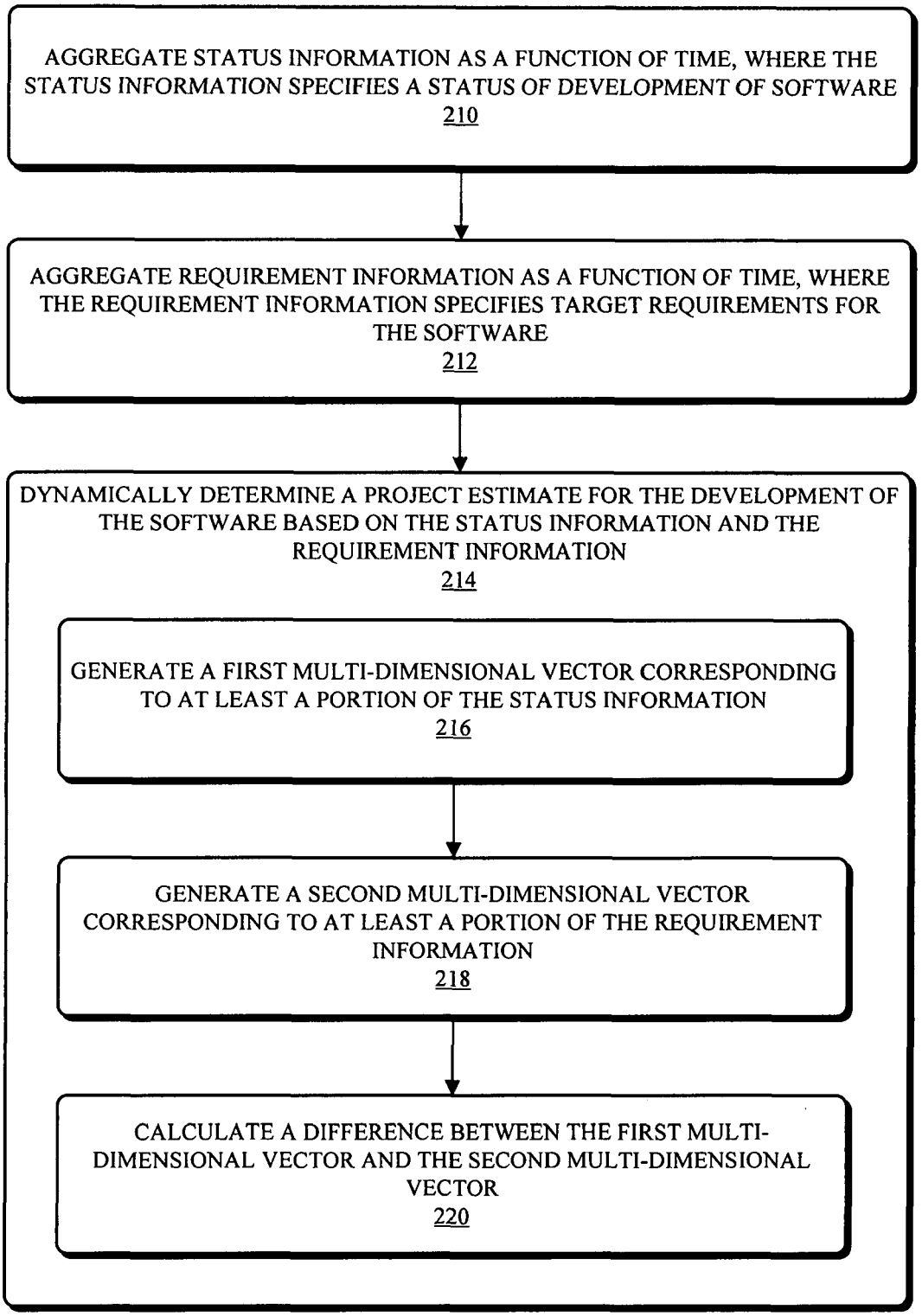
FIG. 2 is a flow chart illustrating a method for managing development of software in accordance with an embodiment of the present invention.

We now discuss methods for managing development of software. More specifically, FIG. 2 presents a flow chart illustrating an embodiment of a method 200 for managing development of software, which may be implemented in a computer system (such as the computer system 300 in FIG. 3). During operation, this computer system aggregates status information (210) as a function of time and aggregates requirement information (212) as a function of time, where the status information specifies a status of the development of the software and the requirement information specifies target requirements for the software. Then, the system dynamically determines a project estimate for the development of the software based on the status information and the requirement information (214).

In some embodiments, the dynamic determination involves generating a first multi-dimensional vector corresponding to at least a portion of the status information (216) and generating a second multi-dimensional vector corresponding to at least a portion of the requirement information (218). Then, the system calculates a difference between the first multi-dimensional vector and the second multi-dimensional vector (220).

Note that in some embodiments of the method 200 there may be: additional or fewer operations; the order of the operations may be changed; and two or more operations may be combined into a single operation.

Figure 3:
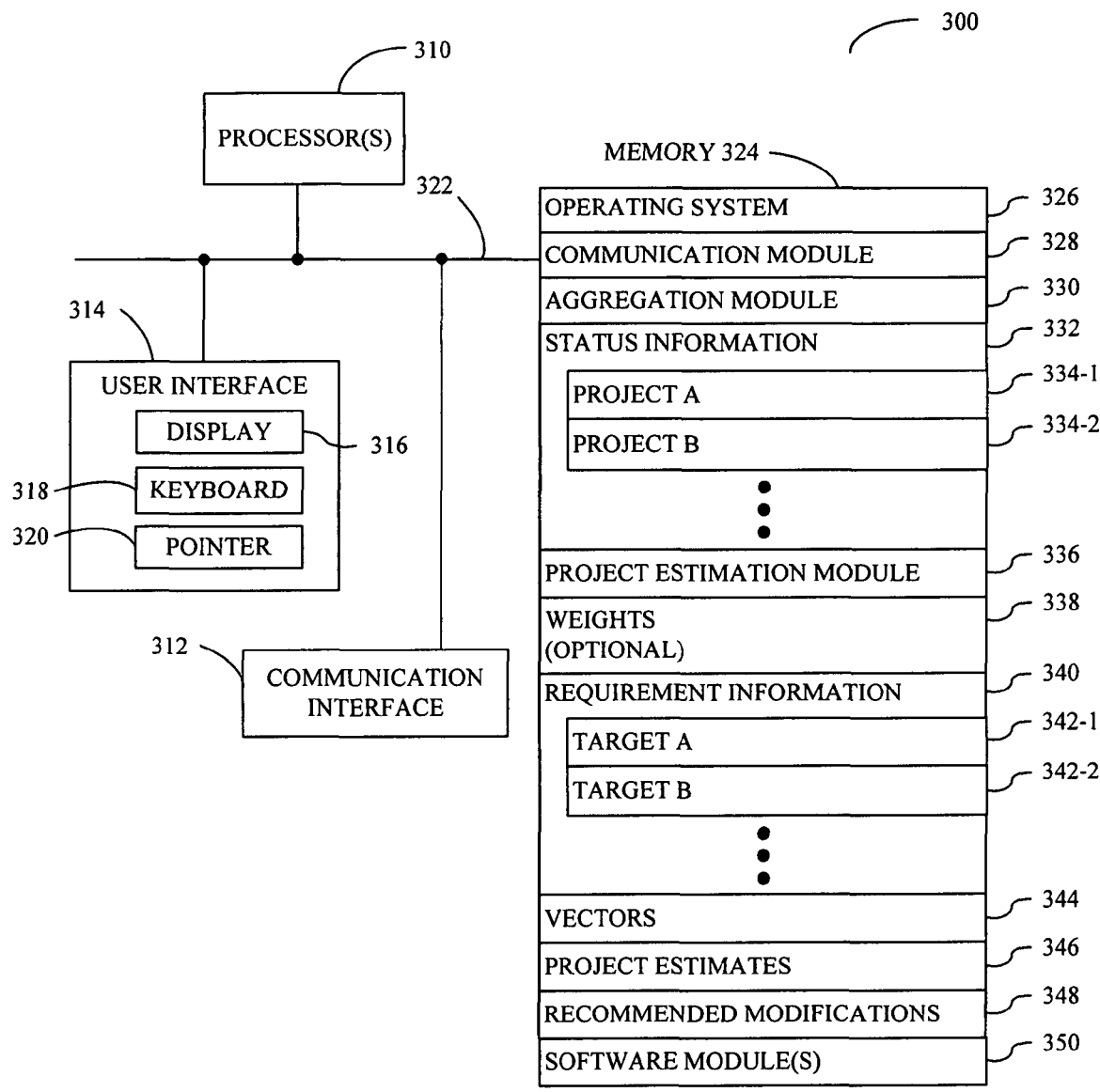
FIG. 3 is a block diagram illustrating a computer system in accordance with an embodiment of the present invention.

We now describe computer systems for implementing these techniques for managing the development of software. FIG. 3 presents a block diagram illustrating an embodiment of a computer system 300. Computer system 300 includes: one or more processors 310, a communication interface 312, a user interface 314, and one or more signal lines 322 coupling these components together. Note that the one or more processing units 310 may support parallel processing and/or multi-threaded operation, the communication interface 312 may have a persistent communication connection, and the one or more signal lines 322 may constitute a communication bus. Moreover, the user interface 314 may include: a display 316, a keyboard 318, and/or a pointer 320, such as a mouse.

Memory 324 in the computer system 300 may include volatile memory and/or non-volatile memory. More specifically, memory 324 may include: ROM, RAM, EPROM, EEPROM, FLASH, one or more smart cards, one or more magnetic disc storage devices, and/or one or more optical storage devices. Memory 324 may store an operating system 326 that includes procedures (or a set of instructions) for handling various basic system services for performing hardware dependent tasks. Memory 324 may also store communication procedures (or a set of instructions) in a communication module 328. These communication procedures may be used for communicating with one or more computers and/or servers, including computers and/or servers that are remotely located with respect to the computer system 300.

Memory 324 may include multiple program modules (or a set of instructions), including aggregation module 330 (or a set of instructions), project estimation module 336 (or a set of instructions), and/or one or more software programs or modules 350 (or a set of instructions) that are being developed. Aggregation module 330 may collect status information 332 (such as that for project A 334-1 and/or project B 334-2) from multiple sources over time, and may collect requirement information 340 (such as target A 342-1 and/or target B 342-2) from multiple sources over time.

Then, project estimation module 336 may generate multi-dimensional vectors 344, and may determine one or more project estimates 346 and/or recommended modifications 348. Note that the multi-dimensional vectors 344 may be generated using optional weights 338.

Instructions in the various modules in the memory 324 may be implemented in a high-level procedural language, an object-oriented programming language, and/or in an assembly or machine language. The programming language may be compiled or interpreted, i.e., configurable or configured to be executed by the one or more processing units 310.

Although the computer system 300 is illustrated as having a number of discrete components, FIG. 3 is intended to provide a functional description of the various features that may be present in the computer system 300 rather than as a structural schematic of the embodiments described herein. In practice, and as recognized by those of ordinary skill in the art, the functions of the computer system 300 may be distributed over a large number of servers or computers, with various groups of the servers or computers performing particular subsets of the functions. In some embodiments, some or all of the functionality of the computer system 300 may be implemented in one or more ASICs and/or one or more digital signal processors DSPs.

Computer system 300 may include fewer components or additional components, two or more components may be combined into a single component, and/or a position of one or more components may be changed. In some embodiments the functionality of the computer system 300 may be implemented more in hardware and less in software, or less in hardware and more in software, as is known in the art.

We now discuss data structures that may be used in the computer system 300. FIG. 4 presents a block diagram illustrating an embodiment of a data structure 400. This data structure may include status information 410 for one or more programs or for a given project at different times. A given entry in the data structure, such as status information 410-1, may include: a time stamp 412-1, a number of defects or bugs 414-1, features 416-1 to be coded and/or already completed, a number of engineers 418-1 working on the given project, a number of hours worked 420-1 (for example, since a previous time interval), a number of hours of testing 422-1 performed, and/or a number of lines of code 424-1 that have been written.

FIG. 5 presents a block diagram illustrating an embodiment of a data structure 500. This data structure may include requirement information 510 for one or more programs or for a given project at different times. A given entry in the data structure, such as requirement information 510-1, may include: a time stamp 512-1, targeted completion 514-1 date or time, a budget 516-1, user requirements 518-1, one or more quality metrics 520-1, one or more operating environments 522-1 that the program will execute in, and/or a number of users 524-1 of the program.

Note that that in some embodiments of the data structures 400 (FIG. 4) and/or 500 there may be: fewer or additional components; two or more components may be combined into a single component; and/or a position of one or more components is changed.

While the preceding discussion has used software as an illustrative example, in other embodiments these techniques may be used for managing the development of a wide variety of products, including software and/or hardware.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for managing development of software, comprising:
   aggregating status information as a function of time, wherein the status information specifies a status of the development of the software;
   aggregating requirement information as a function of time, wherein the requirement information specifies target requirements for the software; and
   dynamically determining a project estimate for the development of the software based on the status information and the requirement information
   by generating a first multi-dimensional vector corresponding to at least a portion of the status information and a second multi-dimensional vector corresponding to at least a portion of the requirement information, calculating a correction vector that represents a difference between the first multi-dimensional vector and the second multi-dimensional vector, and using the correction vector to determine the project estimate.

2. The method of claim 1, wherein the requirement information includes a confidence region surrounding an end point in the development.

3. The method of claim 1, wherein the project estimate includes an estimated completion time.

4. The method of claim 1, wherein the project estimate includes recommended modifications to development resources to meet a targeted completion time.

5. The method of claim 4, wherein the recommended modifications include changes to a number of development engineers.

6. The method of claim 4, wherein the recommended modifications include changes to features to be developed for the software.

7. The method of claim 1, wherein the project estimate includes recommended modifications to user requirements.

8. The method of claim 7, wherein the recommended modifications include changes to features to be developed for the software.

9. The method of claim 7, wherein the recommended modifications include changes to a confidence region surrounding an end point in the development.

10. A computer system to manage development of software, comprising:
    a processor;
    memory;
    a program module, wherein the program module is stored in the memory and configurable to be executed by the processor, the program module including:
       instructions for aggregating status information as a function of time, wherein the status information specifies a status of the development of the software;
       instructions for aggregating requirement information as a function of time, wherein the requirement information specifies target requirements for the software; and
       instructions for dynamically determining a project estimate for the development of the software based on the status information and the requirement information
    by generating a first multi-dimensional vector corresponding to at least a portion of the status information and a second multi-dimensional vector corresponding to at least a portion of the requirement information, calculating a correction vector that represents a difference between the first multi-dimensional vector and the second multi-dimensional vector, and using the correction vector to determine the project estimate.

11. A computer program product for use in conjunction with a computer system, the computer program product comprising a non-transitory computer-readable storage medium and a computer-program mechanism embedded therein for managing development of software, the computer-program mechanism including:
    instructions for aggregating status information as a function of time, wherein the status information specifies a status of the development of the software;
    instructions for aggregating requirement information as a function of time, wherein the requirement information specifies target requirements for the software; and
    instructions for dynamically determining a project estimate for the development of the software based on the status information and the requirement information
    by generating a first multi-dimensional vector corresponding to at least a portion of the status information and a second multi-dimensional vector corresponding to at least a portion of the requirement information, calculating a correction vector that represents a difference between the first multi-dimensional vector and the second multi-dimensional vector, and using the correction vector to determine the project estimate.

12. The computer program product of claim 11, wherein generation of the first multi-dimensional vector involves using different weights for two variables in at least the portion of the status information.

13. The computer program product of claim 11, wherein generation of the second multi-dimensional vector involves using different weights for two variables in at least the portion of the requirement information.

14. The computer program product of claim 11, wherein the status information includes: time stamps, a number of reported bugs, features to be developed for the software, a number of development engineers, a number of hours worked developing the software, a number of hours worked testing the software, or a number of lines of code in the software.

15. The computer program product of claim 11, wherein the requirement information includes: time stamps, a targeted completion time, budgetary constraints, user requirements, one or more quality metrics for the software, one or more operating environments, or a number of users.

16. The computer program product of claim 11, wherein the requirement information includes a confidence region surrounding an end point in the development.

17. The computer program product of claim 11, wherein the project estimate includes an estimated completion time.

18. The computer program product of claim 11, wherein the project estimate includes recommended modifications to development resources to meet a targeted completion time.

19. The computer program product of claim 18, wherein the recommended modifications include changes to a number of development engineers.

20. The computer program product of claim 18, wherein the recommended modifications include changes to features to be developed for the software.

21. The computer program product of claim 11, wherein the project estimate includes recommended modifications to user requirements or quality metrics for the software.

22. The computer program product of claim 21, wherein the recommended modifications include changes to features to be developed for the software.

23. The computer program product of claim 21, wherein the recommended modifications include changes to a confidence region surrounding an end point in the development.

24. The computer program product of claim 11, wherein aggregation of the requirement information involves adding or subtracting variables as a function of time.

25. The computer program product of claim 11, wherein the project estimate is based on a rate at which development engineers develop a given feature for the software.

26. The computer program product of claim 11, wherein the project estimate is based on a rate at which development engineers correct a given reported bug in the software.

* * * * *